United States Patent
Sinusas

(10) Patent No.: US 11,427,090 B2
(45) Date of Patent: Aug. 30, 2022

(54) VARIABLE SPEED ROTOR WITH SLOW ROTATION MODE

(71) Applicant: Bell Helicopter Textron Inc., Fort Worth, TX (US)

(72) Inventor: Eric Albert Sinusas, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 115 days.

(21) Appl. No.: 16/103,426

(22) Filed: Aug. 14, 2018

(65) Prior Publication Data
US 2020/0055410 A1    Feb. 20, 2020

(51) Int. Cl.
| B60L 15/30 | (2006.01) |
| B60L 15/20 | (2006.01) |
| B64C 27/16 | (2006.01) |
| H02P 5/74 | (2006.01) |
| H02P 3/06 | (2006.01) |

(52) U.S. Cl.
CPC ........... B60L 15/30 (2013.01); B60L 15/2009 (2013.01); B64C 27/16 (2013.01); H02P 5/74 (2013.01); B60L 2200/10 (2013.01); H02P 3/06 (2013.01)

(58) Field of Classification Search
CPC ...... B60L 15/30; B60L 15/2009; B64C 27/16; H02P 5/74; H02P 3/06
USPC ............................................... 318/4; 315/159
See application file for complete search history.

(56) References Cited

U.S. PATENT DOCUMENTS

| 7,252,165 | B1 * | 8/2007 | Gruenwald | B60L 1/003 |
| | | | | 180/65.25 |
| 9,242,728 | B2 * | 1/2016 | Morrison | B64C 27/32 |
| 2010/0230547 | A1 | 9/2010 | Tayman | |
| 2013/0119185 | A1 * | 5/2013 | Botti | B64C 27/14 |
| | | | | 244/17.11 |
| 2013/0206915 | A1 * | 8/2013 | Desaulniers | B64C 39/028 |
| | | | | 244/165 |
| 2013/0264412 | A1 * | 10/2013 | Dyrla | B64C 27/82 |
| | | | | 244/17.13 |
| 2017/0190417 | A1 * | 7/2017 | Devito | B64C 27/82 |
| 2017/0260872 | A1 * | 9/2017 | Munevar | H02P 3/06 |

FOREIGN PATENT DOCUMENTS

| CA | 2969663 | A1 | 12/2017 |
| EP | 3251952 | A1 | 12/2017 |
| GB | 2419122 | A | 4/2006 |

* cited by examiner

*Primary Examiner* — Muhammad S Islam
*Assistant Examiner* — Zemenay T Truneh
(74) *Attorney, Agent, or Firm* — Shackelford, Bowen, McKinley & Norton, LLP

(57) ABSTRACT

An exemplary method includes controlling a rotation rate of a rotor in a vehicle, detecting that an electric motor system is electrically energized and rotating the rotor at least at a minimum rotation rate that is greater than zero in response to the electric motor system being electrically energized. The rotor may be rotated at least at the minimum rotation rate when the electric motor system is energized and the motor is turned-off.

11 Claims, 4 Drawing Sheets

_US 11,427,090 B2_

VARIABLE SPEED ROTOR WITH SLOW ROTATION MODE

BACKGROUND

This section provides background information to facilitate a better understanding of the various aspects of the disclosure. It should be understood that the statements in this section of this document are to be read in this light, and not as admissions of prior art.

When an aircraft is on the ground, personnel must perform various tasks in close proximity to the rotational path of rotors. Combustion engines drive rotors in conventional aircraft and the rotors cannot spin unless the engine is running. Through experience, personnel have been trained that it is safe to be in a rotor's rotational path when the rotor is not spinning and they do not hear an engine running.

Electrically powered vehicles present a danger not presented by combustion engine powered vehicles. If a rotor in an electric powered vehicle is stationary, there is no visual or audible indication that the rotor system is energized and that it can begin spinning unexpectedly and instantaneously. Unexpected energized motor start-up can occur for various reasons including an electrical short or inadvertent actuation of a switch.

SUMMARY

An exemplary vehicle includes an electric motor system having a motor coupled to a rotor and a system connected to the motor to drive the rotor at least at a minimum rotation rate greater than zero when the electric motor system is energized. An exemplary aircraft includes an electric motor system including a motor coupled to a rotor and a system connected to the motor to drive the rotor when the electric motor system is energized at least at a minimum rotation rate greater than zero.

An exemplary method includes controlling a rotation rate of a rotor in a vehicle, detecting that an electric motor system is electrically energized and rotating the rotor at least at a minimum rotation rate that is greater than zero in response to the electric motor system being electrically energized. The rotor may be rotated at least at the minimum rotation rate when the electric motor system is energized and the motor is turned-off.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
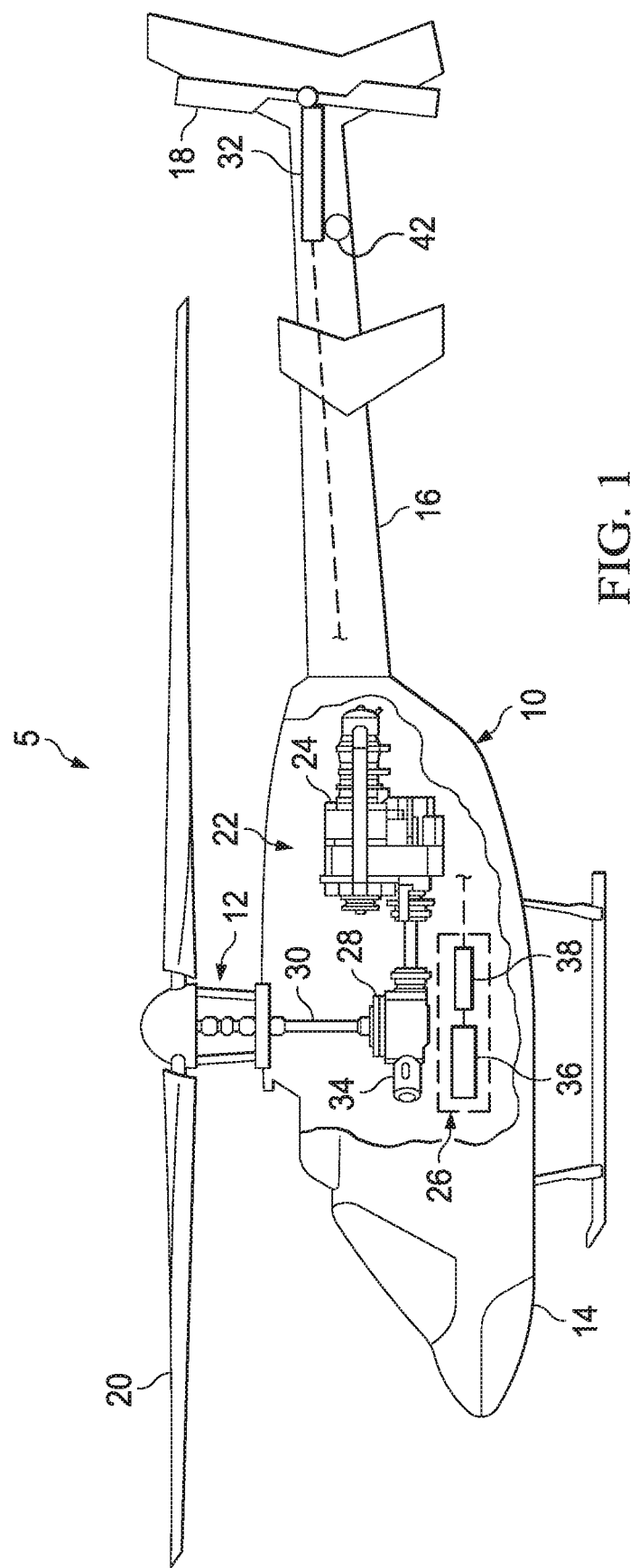
FIG. 1 illustrates a vertical takeoff and landing aircraft incorporating a variable speed rotor with a slow rotation mode according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 illustrates an exemplary vertical takeoff and landing (VTOL) aircraft 10 incorporating an electric powered variable speed rotor with a slow rotation system 5 according to an embodiment of the disclosure. VTOL aircraft 10 includes a rotor system 12, a fuselage 14, and a tail boom 16 carrying an anti-torque system represented by rotor 18. Rotor system 12 includes rotor 20 having multiple blades for creating flight. Rotor system 12 may include a control system for selectively controlling the pitch of each blade of rotor 20 to control direction, thrust, and lift of VTOL aircraft 10. Tail boom 16 may include one or more rotors 18. Rotor 18 may provide thrust in the same direction as the rotation of rotor blades 20 to counter the torque effect created by rotor system 12. Teachings of certain embodiments recognize that rotor 18 may represent one example of a rotor or anti-torque rotor; other examples include, but are not limited to, tail propellers, ducted tail rotors, and ducted fans mounted inside and/or outside the aircraft. The anti-torque system may include two or more rotors 18, such as in an electric distributed anti-torque system. Teachings of certain embodiments relating to rotors and rotor systems may apply to rotor system 12 and other rotor systems, such as electrically distributed rotors, tiltrotor, tilt-wing, and helicopter rotor systems. It should be appreciated that teachings herein apply to manned and unmanned vehicles and aircraft including without limitation airplanes, rotorcraft, hovercraft, helicopters, and rotary-wing vehicles.

An exemplary VTOL aircraft 10 incorporates a hybrid propulsion system 22 including a combustion engine 24 and an electric motor system 26. Combustion engine 24 is mechanically connected to a transmission 28 and transmission 28 is mechanically connected to rotor 20 through mast 30. In this example, electric motor system 26 includes an electric motor 32 mechanically connected to rotor 18, a generator 34 coupled to combustion engine 24 and electric motor 32, and a controller 36, e.g., an electronic speed controller. Electric motor system 26 may include one or more batteries 38.

Electric motor 32 may be controlled by controller 36 over a range of speeds in response to a pilot and/or flight control system. Controller 36 can include logic to control the rate of rotation of rotor 18 via electric motor 32. Controller 36 may be included for example in the motor controller or the flight computer, be a component of the motor controller or the flight computer, and/or be in communication with the motor controller or the flight computer. Electric motor system 26 may include one or more batteries 38.

Controller 36 can include logic to control the rate of rotation of rotor 18 via electric motor 32. Controller 36 ensures that rotor 18 rotates at least at a minimum rotation rate greater than zero when electric motor 32 is energized. For example, when VTOL aircraft 10 is landed, motor 32 may be turned-off and electric motor system 26 may remain energized. Controller 36 controls energized motor 32 to rotate rotor 18 at rotation rate that provides a visual indication and warning that rotor 18 is energized. In an exemplary embodiment, controller 36 controls energized motor 32 to always rotate rotor 18 at least at a minimum rotation rate, unless for example the slow rotation mode is manually overridden to stop the rotation. This default or safety rotation rate is referred to as a minimum rotation rate that is greater than zero and less than a rotation rate that will create thrust. In an embodiment, the minimum rotation rate may be approximately 0.5 revolutions per minute (RPM) or less. The minimum rotation rate may be approximately 1 RPM.

In an embodiment, the minimum rotation rate may be in a range of approximately 0.5 RPM and 3 RPM. In accordance to an embodiment, the minimum rotation rate may be approximately 5 RPM or less.

In an embodiment, the minimum rotation rate can be overridden for example by a person actuating a manual override 42. With reference to FIG. 1, slow rotation system 5 includes a manual override 42 represented by a switch located proximate to or adjacent the controlled rotor, rotor 18. Override switch 42 is located within reach of a person that is positioned in the rotation path of rotor 18 so that the person operating override switch 42 is aware that the rotor system is energized and the person in the rotation path is can override the minimum rotation to perform a task on the controlled rotor. For example, manual override switch 42 may be located approximately three feet or less from the rotor. In an embodiment, manual override switch 42 is located approximately three feet or less from the rotor as measured from center of the rotor. In an embodiment, manual override switch 42 is located within about two feet or less from the rotor. In an embodiment, manual override switch 42 is a push-button of switch requiring constant pressure to be maintained in the override position.

For ease of description, some of the required systems and devices operably associated with the present control system are not shown, i.e., sensors, connectors, power sources, mounting supports, circuitry, software, and so forth, in order to clearly depict the novel features of the system. However, it is understood that the system is operably associated with these and other required systems and devices for operation, as conventionally known in the art, although not shown in the drawings.

Figure 2:
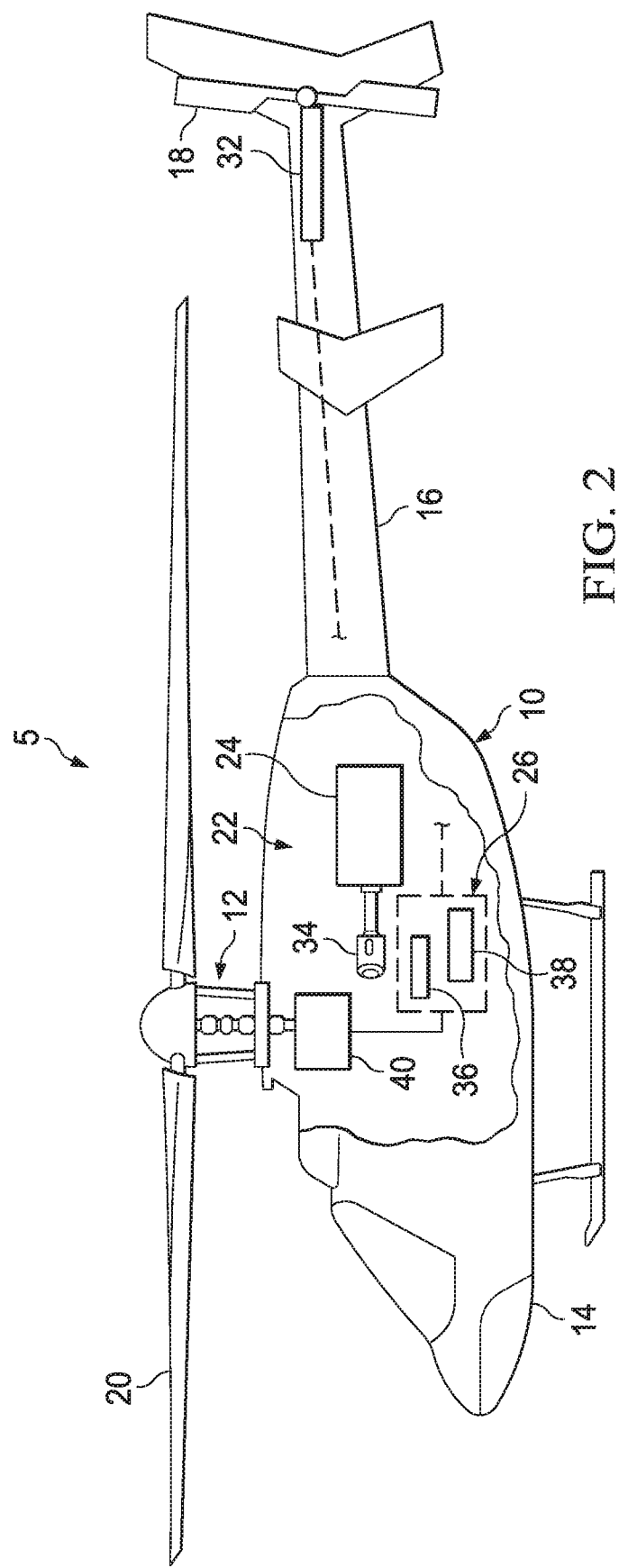
FIG. 2 illustrates another vertical takeoff and landing aircraft incorporating a variable speed rotor with a slow rotation mode according to one or more aspects of the disclosure.

FIG. 2 illustrates another exemplary VTOL aircraft 10 incorporating an electric powered variable speed rotor with a slow rotation system 5 according to aspects of the disclosure. Rotor 18 and rotor 20 are both driven by electric motors in this exemplary VTOL aircraft 10. Electric motor system 26 includes first electric motor 32 to drive rotor 18 and a second electric motor 40 to drive rotor 20. Combustion engine 24 may be operated intermittently to drive generator 34 and recharge batteries 38 and/or directly power electric motors 32, 40. Combustion engine 24 is not mechanically coupled to rotor system 12. In an all-electric embodiment, electric motors 32, 40 are powered by batteries 38 and VTOL aircraft 10 does not carry combustion engine 24 and generators 34.

Electric motors 32 and 40 can be controlled by controller 36 individually or by controllers 36 over a range of speeds in response to a pilot and/or flight control system. Controller 36 can include logic to control the rate of rotation of rotors 18, 20 via electric motors 32, 40. Controller 36 may be included for example in the motor controller or the flight computer, be a component of the motor controller or the flight computer, and/or be in communication with the motor controller or the flight computer.

Controller 36 ensures that rotors 18, 20 rotate at least at a minimum rotation rate greater than zero when electric motors 32, 40 are energized. For example, when VTOL aircraft 10 is on the ground and motor 32 is turned-off but still energized by an electric power source, controller 36 controls the speed of motor 32 to rotate rotor 18 and provide a visual indication and warning that rotor 18 is energized. If motor 40 is energized, controller 36 controls the speed of motor 40 to rotate rotor 20 and provide a visual indication and warning that rotor 20 is energized. In an exemplary embodiment, controller 36 controls the energized motor to always rotate the associated rotor at least at a minimum rotation rate unless for example controller 36 is manually overridden to stop rotation. This default or safety rotation rate is referred to as a minimum rotation rate that is greater than zero and less than a rotation rate that will create thrust.

Figure 3:
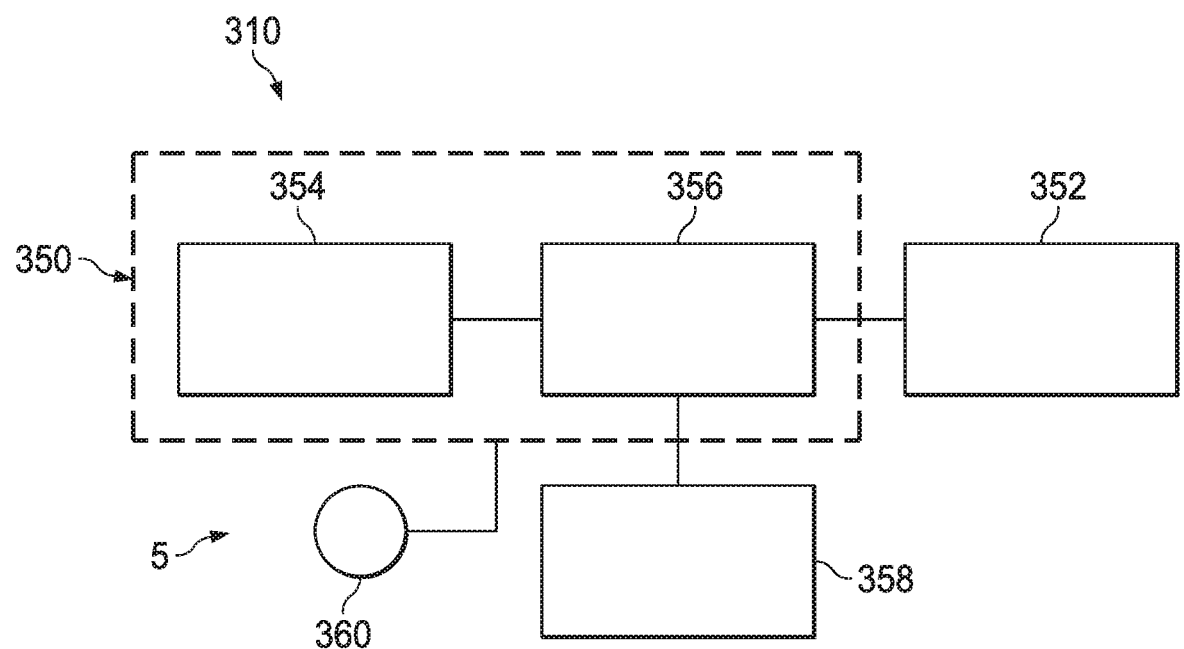
FIG. 3 schematically illustrates a vehicle incorporating a variable speed rotor with a slow rotation mode according to one or more aspects of the disclosure.

FIG. 3 is a schematic illustration of an exemplary electric powered variable speed rotor with a slow rotation system 5 incorporated in a vehicle 310 according to aspects of the disclosure. Vehicle 310 includes an electric motor system 350 driving a variable speed rotor 352. Electric motor system 350 includes an electric power source 354 and an electric motor 356. Vehicle 310 may include two or more electric motors 356. Electric power source 354 may include a generator and/or batteries. In this example, electric motor 356 is a variable speed motor. Slow rotation system 5 includes a controller 358 electronically connected to motor 356. Controller 358 carries logic to control electric motor 356 to drive rotor 352 at least at a minimum rotation rate that is greater than zero when electric motor system 350 is energized. The minimum rotation rate does not create thrust. For example, if electric motor 356 is turned-off, but electric motor system 350 is still electrically energized, controller 358 controls the speed of electric motor 356 to rotate rotor 352 at a rotation rate that is greater than zero.

In an embodiment, slow rotation system 5 includes manual override 360 to stop rotation of the rotor. Manual override 360 is represented by a switch located physically adjacent or proximate to rotor 352 and electronically connected to electric motor system 350. Override switch 42 is located within reach of a person that is positioned in the rotation path of rotor 352 so that a person that needs to be in the rotation path of rotor 352, for example for maintenance, can override slow rotation system 5 and stop the rotor rotation. In an embodiment, override switch 360 is a pushbutton of switch requiring constant pressure to be maintained in the override position.

In an exemplary embodiment, vehicle 310 is a vertical takeoff and landing aircraft. Rotor 352 may be the main rotor (e.g., proprotor), an anti-torque rotor, or a push propeller or fan. An anti-torque rotor may include for example rotor blades, tail propellers, ducted tail rotors, and ducted fans mounted inside and/or outside the aircraft. A push propeller may provide a forward thrust in a cruise or transitional mode.

Figure 4:
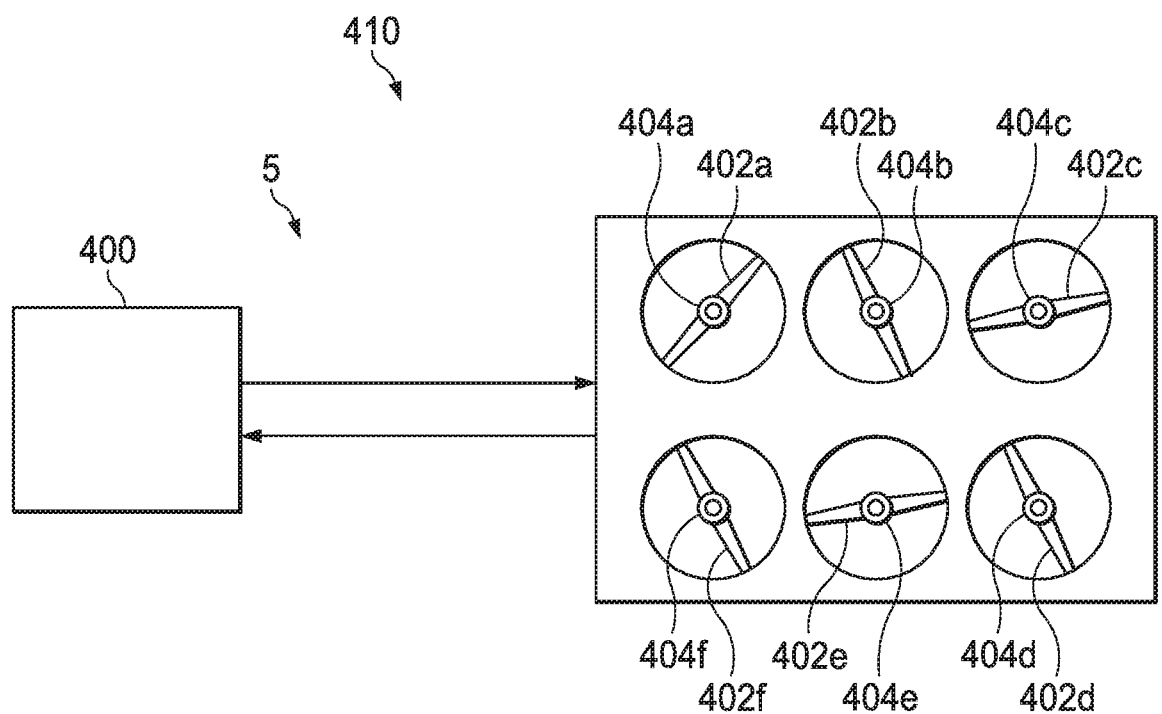
FIG. 4 schematically illustrates an electrically distributed rotor aircraft incorporating variable speed rotors with slow rotation mode according to one or more aspects of the disclosure.

FIG. 4 illustrates an exemplary variable speed rotor with slow rotation system 5 incorporated in an electric distributed rotor aircraft 410. Aircraft 410 includes a plurality of rotors generally denoted 402 and individually denoted 402a-402f. Each rotor 402 having an associated variable speed electric motor generally denoted 404 and individually denoted 404a-404f. Control logic 400 controls the speed of the one or more variable speed motors 404a-404f. Control logic 400 controls the speed of the variable speed motors to drive the rotors 402a-402f at least at a minimum rotation rate greater than zero in response to variable speed motors 404a-404f being energized. The minimum rotation rate or speed is less than a rotation rate at which the rotor produces thrust. In an embodiment, the minimum rotation rate may be approximately 0.5 revolutions per minute (RPM) or less. The rotation rate may be approximately 1 RPM. In an embodiment, the minimum rotation rate may be in a range of approximately 0.5 RPM and 3 RPM. In an embodiment, the minimum rotation rate may be approximately 5 RPM or less. In accordance with an embodiment, the minimum rotation rate provides a visual indication that the rotor is turning and the electric motor is energized without producing thrust.

Figure 5:
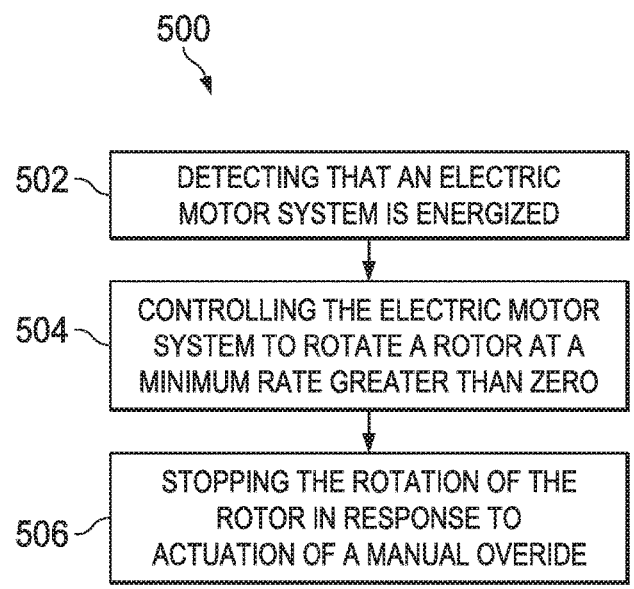
FIG. 5 illustrates a flowchart for an exemplary method of operating a variable speed rotor with a slow rotation mode according to one or more aspects of the disclosure.

FIG. 5 illustrates an exemplary logic 500 according to aspects of the disclosure. Logic 500 detects at block 502 if an electric motor system is energized. In response to detecting that the electric motor is energized, logic 500 controls the electric motor system, at block 504, to drive an associated rotor at least at a minimum rotation rate that is greater than zero. If the electric motor is turned-off and the motor system is electrically energized, logic 500 controls the electric motor to drive the associated rotor to rotate at rotation rate that is greater than zero. In some embodiments, logic 500 stops the rotation of the rotor, at block 506, in response to actuation of a manual override, such as manual override 42 (FIG. 1) or manual override 360 (FIG. 3).

Figure 6:
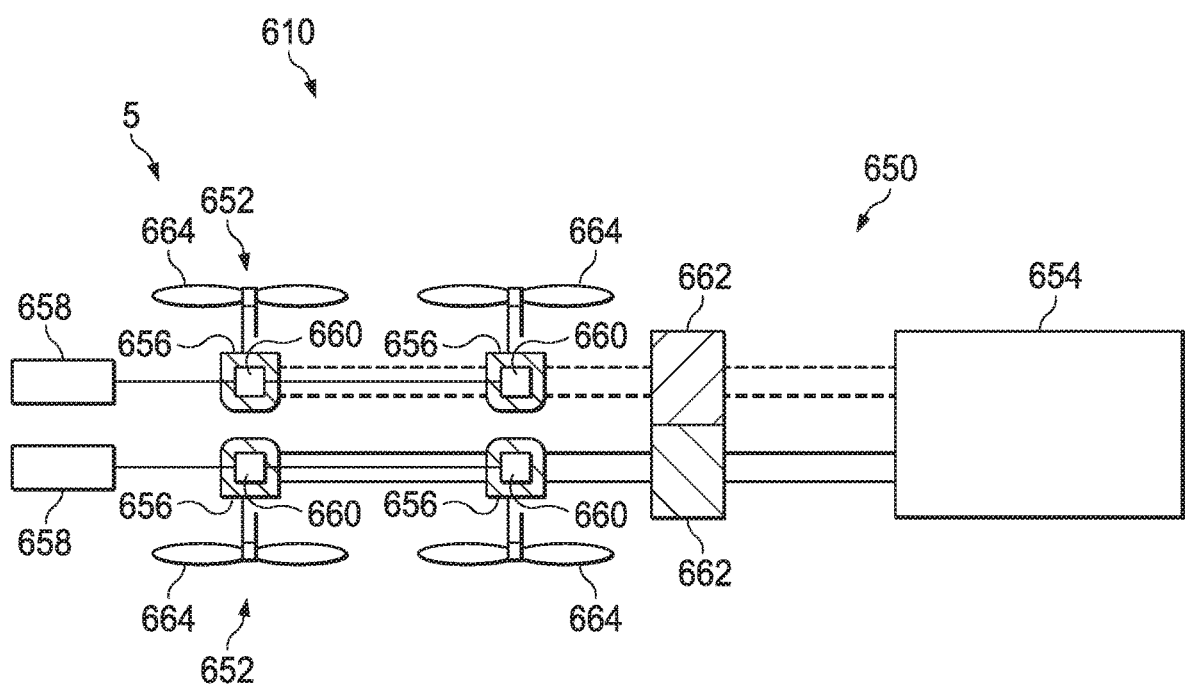
FIG. 6 schematically illustrates another electrically distributed rotor aircraft incorporating variable speed rotors with slow rotation mode according to one or more aspects of the disclosure.

FIG. 6 is a diagram of an exemplary VTOL aircraft 610 implementing a variable speed rotor with a slow rotation mode 5. Aircraft 610 includes an electric motor system 650 driving rotors 652. Each rotor 652 includes one or more blades 664. Rotors 652 are arranged in an electric distributed rotor matrix or system. In an exemplary embodiment, rotors 652 are arranged in an electric distributed anti-torque system. An anti-torque rotor may include for example rotor blades, fans, ducted tail rotors, and ducted fans mounted inside and/or outside the aircraft.

Electric motor system 650 includes an electric power source 654 and electric motors 656. In this example, electric motor 656 is a variable speed motor and each electric motor has an individual speed control 660. Electric power source 654 and motors 656 are connected to controllers 658, which can be the flight control computer, and a power management unit 662. Controller 658 carries logic, e.g., logic 500 (FIG. 5), to control electric motors 656 to drive rotors 652 at least at a minimum rotation rate that is greater than zero when electric motor system 650 is energized. In accordance with aspects of the disclosure, the minimum rotation rate does not create thrust.

The term "approximately" is defined as largely but not necessarily wholly what is specified (and includes what is specified; e.g., approximately 90 degrees includes 90 degrees and approximately parallel includes parallel), as understood by a person of ordinary skill in the art. In any disclosed embodiment, the terms "substantially," "approximately," "generally," and "about" may be substituted with "within [a percentage] of" what is specified, where the percentage may include for example 0.1, 1, and 5 percent as may be recognized by a person skilled in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A vehicle, comprising:
   an electric motor system including a motor coupled to an anti-torque rotor, wherein the motor is configured, when turned-on, to drive the anti-torque rotor at a rotational rate that will create thrust; and a controller connected to the motor to control the motor to drive the anti-torque rotor, when the motor system is energized and the motor is turned-off, at least at a minimum rotation rate greater than zero and less than a rotation rate that will create thrust; and a manual override switch located proximate to the anti-torque rotor, the manual override switch operable to stop the rotation of the anti-torque rotor.

2. The vehicle of claim 1, wherein the minimum rotation rate is approximately 5 revolutions per minute (RPM) or less.

3. The vehicle of claim 1, wherein the minimum rotation rate is in a range of approximately 0.5 revolutions per minute (RPM) and 3 RPM.

4. An aircraft, comprising:

an electric motor system including a motor coupled to an anti-torque rotor;

a controller connected to the motor to control the motor to drive the anti-torque rotor at a rotation rate that will create thrust when the motor is turned-on and to control the motor to drive the anti-torque rotor at least at a minimum rotation rate greater than zero and less than a rotation rate that will create thrust when the motor system is electrically energized by the electric power source and the motor is turned-off; and a manual override switch located proximate to the anti-torque rotor, the manual override switch operable to stop the rotation of the anti-torque rotor.

5. The aircraft of claim 4, wherein the anti-torque rotor arranged in an electric anti-toque distributed system.

6. The aircraft of claim 4, wherein the aircraft is a helicopter.

7. The aircraft of claim 4, wherein the manual override switch is positioned within approximately three feet or less from a center of the anti-torque rotor.

8. A method, comprising:

controlling a rotation rate of an anti-torque rotor in a vertical takeoff and landing (VTOL) aircraft, wherein the anti-torque rotor is driven by a motor of an electric motor system;

detecting that the motor system is electrically energized and that the motor is turned-off;

controlling the motor to drive the anti-torque rotor at a minimum rotation rate that is greater than zero and less than a rotation rate that will create thrust in response to detecting that the motor system is electrically energized and that the motor is turned-off; and stopping rotation of the anti-torque rotor in response to a person manually holding a manual override switch, that is positioned proximate to the anti-torque rotor, in an override position.

9. The method of claim 8, wherein the VTOL aircraft is a helicopter.

10. The method of claim 8, wherein the anti-torque rotor is arranged in an electric distributed rotor system.

11. The method of claim 8, wherein the manual override switch is positioned within approximately three feet or less from the anti-torque rotor.

* * * * *